United States Patent [19]
Boileau

[11] 3,971,424
[45] July 27, 1976

[54] TIRE TREAD

[75] Inventor: Jacques Boileau, Clermont Ferrand, France

[73] Assignee: Compagnie Generale des Etablissements Michelin, Clermont-Ferrand, France

[22] Filed: July 11, 1975

[21] Appl. No.: 594,970

[30] Foreign Application Priority Data
July 25, 1974 France .............................. 74.25987

[52] U.S. Cl. ............................................ 152/209 R
[51] Int. Cl.² ........................................... B60C 11/06
[58] Field of Search ................................ 152/209 R

[56] References Cited
UNITED STATES PATENTS

| | | | |
|---|---|---|---|
| 2,584,670 | 6/1971 | Verdier | 152/209 R |
| 3,012,599 | 12/1961 | Benson et al. | 152/209 R |
| 3,512,567 | 5/1970 | Verdier | 152/209 R |
| 3,675,700 | 7/1972 | Verdier | 152/209 R |
| 3,799,231 | 3/1974 | Boileau | 152/209 R |
| 3,838,725 | 10/1974 | Lejeune | 152/209 R |
| 3,926,238 | 12/1975 | Vorih | 152/209 R |

Primary Examiner—Drayton E. Hoffman
Attorney, Agent, or Firm—Brumbaugh, Graves, Donohue & Raymond

[57] ABSTRACT

A pneumatic tire has a tread comprising two wide grooves of circumferential orientation and rows of wide grooves of transverse orientation defining circumferential rows of elements in relief. The tread is characterized by the following combination:

a. A middle row and two side rows of elements in relief are formed, separated in each row by grooves of transverse orientation discharging alternately, in the case of the middle row, into the wide grooves of circumferential orientation and, in the case of the side rows, into the adjacent wide groove of circumferential orientation and into the adjacent edge of the tread.

b. The grooves of transverse orientation of each row of elements in relief are connected in pairs by grooves of reduced width and at most the same depth as the depth of the longitudinal and transverse grooves.

c. The sum of the lengths, projected on a meridian section, of the transversely oriented grooves connected in pairs is between 0.75 and 1.5 times the width of the tread.

9 Claims, 2 Drawing Figures

TIRE TREAD

BACKGROUND OF THE INVENTION

This invention relates to pneumatic tires and, more particularly, to a pneumatic tire, whether new or recapped, having a novel and highly-effective tread pattern.

It is known that travel on wet ground, particularly at high speed, raises special problems of adherence due to the inequality of the pressures in the contact or footprint area: the water has a tendency to lift the tire, especially at the center of the area of contact, where the pressure of the tire on the ground is often least. The tire must also be capable of satisfactory service, in particular, of satisfactory adherence and wear on dry roads or ground, especially during cornering. The requirements to be met under various road conditions are contradictory. Thus in order to obtain during high-speed travel an adherence on wet ground which approaches the adherence on dry ground, it is essential on the one hand that the differences in pressure in the contact area of the tire be as small as possible and on the other hand that the evacuation of the water in the contact area of the tire be effective. For this purpose, it is advantageous to divide the tread by deep, wide, oblique or transverse grooves. On the other hand, in order to travel on dry surfaces while avoiding non-uniform wear, that is to say faster wear on the edges than in the central portion of the tread, particularly during cornering, it is desirable to assure the longitudinal continuity of the relief elements of the tread, particularly at the edges.

SUMMARY OF THE INVENTION

An object of the present invention is to make it possible to effect a satisfactory compromise between the contradictory requirements set forth above, that is to say to improve the adherence of the tire when traveling at high speed on wet ground, to make the wear uniform over the entire width of the tread, and to decrease the wear on dry ground.

The foregoing and other objects are attained in accordance with the invention by providing a pneumatic tire having a tread comprising two wide grooves of circumferential orientation and rows of wide grooves of transverse orientation defining circumferential rows of elements in relief. The tread is characterized by the following combination:

a. Three circumferential rows of relief elements are provided, separated in each row by grooves of transverse orientation. In the central row of relief elements, the transverse grooves discharge alternately into the wide grooves of circumferential orientation, and, in the case of the side rows, the transverse grooves discharge alternately into the respective adjacent wide grooves of circumferential orientation and into the respective adjacent edges of the tread.

b. The grooves of transverse orientation of each row of elements in relief are connected in pairs by grooves or cuts of reduced width and of a depth which at most is the same as that of the transverse grooves.

c. The sum of the lengths, projected on a meridian cross-section of the transversely oriented grooves connected in pairs is between 0.75 and 1.5 times the width of the tread.

The width of the tread is the distance measured on a meridian section of the tire between the two side edges limiting the tread or, if the edges are of rounded profile, the distance measured between the points of intersection of the two tangents drawn to the upper part of the sidewall on either side of the shoulders with the arc of the circle fitting the surface of the tread.

By definition, a circumferentially-oriented groove is a groove whose contour follows on the average the circumferential direction of the tire and does not deviate from it by more than 45°.

Likewise, a transversely oriented groove is a groove whose outline follows, on the average, the direction perpendicular to the circumferential direction and does not deviate from it by more than 30°.

In one embodiment of the invention, the grooves connecting in pairs the transversely oriented grooves of the side rows of elements in relief have a depth at most equal to the depth of the wide grooves of circumferential and/or transverse orientation and a width such that, in the area of contact of the tire with the ground, during vigorous cornering, the walls of the connecting grooves rest against each other, at least in their portions which are radially farthest from the axis of the tire, and, in the same area, during travel in a straight line, they close themselves in case of braking or acceleration.

The width of these connecting grooves is at most equal to one half of the width of the transversely oriented grooves. In this way an improvement is obtained in the resistance to wear on the edges of the tread.

In a preferred embodiment of the invention, the grooves connecting the transversely oriented grooves in pairs have, in at least one side row of elements in relief, a greater width than in the central row of elements in relief. The tire should then be mounted with this side row of elements in relief arranged on the outside of the vehicle, in order to obtain improved evacuation of the water in the area of contact.

Preferably, the transversely oriented grooves are linear and form an angle of 90° with the circumferential direction. This arrangement optimizes both the adherence and the drainage of water.

It is also advantageous for the grooves connecting the transversely oriented grooves in pairs to form small angles or zero angles with respect to the circumferential direction of the tire. In case the angles are not zero, they should have opposite signs from one longitudinal row of elements in relief to the next.

The grooves connecting the transversely oriented grooves in pairs are preferably parallel to the wide circumferentially oriented grooves so as to obtain a cut-out of the elements in relief of substantially constant width. This is particularly advantageous if a zigzag or sinusoidal outline is adopted for the wide circumferentially oriented grooves. The grooves connecting the transversely oriented grooves in pairs preferably join the ends of the transverse grooves. The longitudinal adherence is thus reinforced.

Besides the circumferential, transverse and connecting grooves, one can provide very narrow cuts or cuts of practically zero physical thickness, of short length and preferably sinusoidal, arranged longitudinally, transversely or obliquely which may or may not discharge into the tread grooves described above and which are intended to improve the adherence and the flexibility of the relief elements of the tread.

The invention applies, of course, to pneumatic tires of any structure. It is suitable in particular for tires of the radial or semi-radial type.

BRIEF DESCRIPTION OF THE DRAWING

The invention will be fully understood by reference to the following detailed description of the preferred embodiments thereof and to the accompanying drawings, wherein.

DESCRIPTION OF THE PREFERRED EMBODIMENTS

Figure 1:
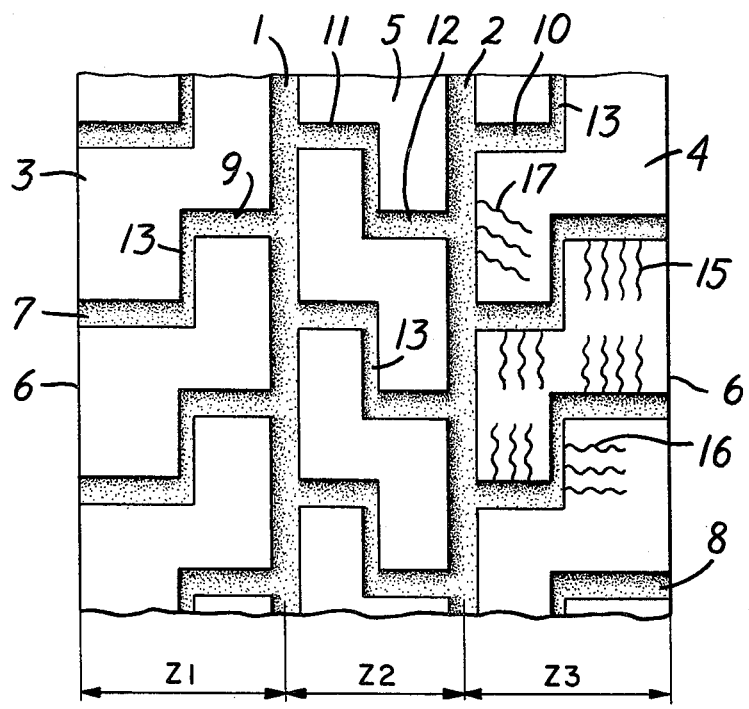
FIGS. 1 and 2 are developed plan views showing, respectively, two embodiments of treads according to the invention, the stippled portions representing the grooves and the portions in white the relief elements.

FIG. 1 shows two wide grooves 1 and 2 of circumferential orientation, respectively substantially at equal distances from one of the edges 6 of the tread, and wide grooves 7, 9; 11, 12; 8, 10 of transverse orientation defining three zones Z1, Z2, Z3 of elements in relief 3, 5 and 4. The grooves of transverse orientation are linear and form an angle of 90° with the circumferential direction of the tire. In the central zone Z2 of elements in relief, the grooves 11 and 12 of transverse orientation discharge alternately into the wide grooves 1 and 2 of circumferential orientation. In the side rows Z1 and Z3 of elements in relief, the grooves of transverse orientation 9 and 10 discharge into the wide groove 1 or 2 of circumferential orientation, while the grooves of transverse orientation 7 and 8 discharge into the adjacent edge 6 of the tread.

The transversely oriented grooves of each zone Z1, Z2, Z3 of elements in relief are connected in pairs at their inner ends by means of grooves or cuts 13 of reduced width and at most the same depth as the depth of the transverse and longitudinal grooves. The sum of the lengths projected on a meridian section of the grooves 7, 9; 11, 12 and 8, 10 of transverse orientation connected in pairs is substantially equal to the width Z1 + Z2 + Z3 of the tread. On both sides of the circumferentially and transversely oriented grooves there can be noted incisions 15, 16, 17 which increase the mobility or flexibility of the relief elements bounded by the various grooves without destroying the solidity thereof.

Figure 2:
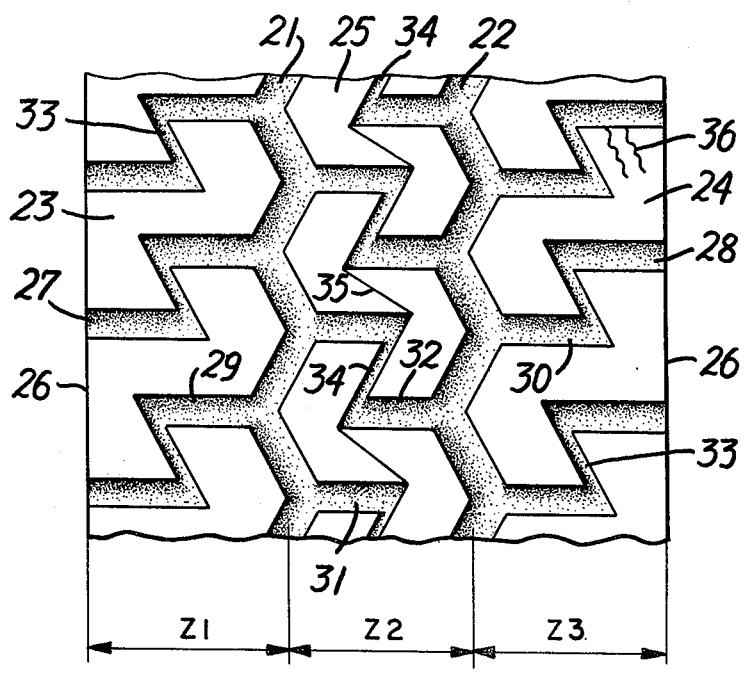

In FIG. 2, which shows a preferred embodiment, there can be noted two wide zigzag grooves 21 and 22 each substantially at the same distance from one of the edges 26 of the tread, and wide grooves 27, 29; 31, 32; and 28, 30 of transverse orientation defining three zones Z1, Z2, Z3 of elements in relief 23, 25, 24. The transversely oriented grooves 29, 31 and 32, 30 are linear and arranged in the salients of the wide grooves 21 and 22, respectively, of circumferential orientation. In the side rows Z1 and Z3 of elements in relief, the transversely oriented grooves 27 and 28 discharge into the respectively adjacent edges 26 of the tread.

In the side zones Z1 and Z3 of elements in relief 23 and 24 the transversely oriented grooves 27, 29 and 30, 28 are connected in pairs at their adjacent, inner ends by cuts or grooves 33 of reduced width as compared with the width of the grooves 27, 29, 30, 28 and parallel to the wide grooves 21 and 22 of circumferential orientation. In the central zone Z2 of relief elements 25, the wide transverse grooves 31, 32 are connected in pairs at their adjacent, inner ends on the one hand by grooves 34 of reduced width less than that of the grooves 33 and on the other hand by incisions 35 of practically zero width. The sum of the lengths projected on a meridian section of the grooves 27, 29, 31, 32, 30, 28 of transverse orientation is substantially equal to 1.1 times the width of the tread. Finally, there can be noted incisions 36 which increase the mobility or flexibility of the relief elements defined by the different grooves without reducing the solidity thereof.

Standardized tests carried out with tires in accordance with the invention, having a tread such as shown in FIG. 2, showed on the one hand that the tires, even at high speed, remain well in contact with the ground in the area of contact and on the other hand that the relative variation $\Delta$ p/p (p being the pressure at the center of the tread) of the pressures under the edges and the center of the tread is less than 60% at very high speed. The same tests carried out with control tires having treads not characterized by the combination of features indicated above show on the one hand that the area of contact becomes concave at high speed and on the other hand that the relative variation $\Delta$ p/p of the pressures acting on the edges and the center of the tread is 350%.

Thus, due to the considerable reduction of the relative difference in pressure, the water no longer has a tendency, at a given speed, to lift, at the center of the area of contact, the tire in accordance with the invention and cause hydroplaning. This results in better adherence of the tire of the present invention when traveling at a high speed over wet ground. This improvement is of the order of 25 to 30% at 100 km/h. Moreover, the behavior and the resistance to wear of a tire in accordance with the invention are definitely improved, because of the closing, under the conditions explained above, of the grooves of reduced width connecting in pairs the transversely oriented grooves in each side zone Z1 and Z3. This results in an imbrication and mutual supporting of the side blocks which effectively creates a continuous circumferential rib during cornering, acceleration and deceleration. Moreover, there is a decrease in wear, particularly in the side regions of the tread, and therefore substantially equal wear of the entire surface of the tread.

Thus there is provided in accordance with the invention a pneumatic tire having a novel and highly-effective tread structure. Many other embodiments within the spirit and scope of the invention will readily occur to those skilled in the art upon consideration of this disclosure. For example, it is within the invention for the different longitudinal grooves to be of different sizes or for the transverse grooves to be of variable lengths, for example alternately shorter and longer, or of variable widths. Accordingly, the invention is to be construed as including all structure which is within the scope of the appended claims and equivalents thereof.

I claim:

1. A pneumatic tire having a tread comprising two wide grooves of circumferential orientation and rows of wide grooves of transverse orientation defining circumferential rows of elements in relief, characterized in that:

a. a middle row and two side rows of elements in relief are formed, separated in each row by grooves of transverse orientation discharging alternately, in the case of the middle row, into the wide grooves of circumferential orientation and, in the case of the side rows, into the adjacent wide groove of circumferential orientation and into the adjacent edge of the tread;

b. the grooves of transverse orientation of each row of elements in relief are connected in pairs by grooves of reduced width and at most the same depth as the depth of said longitudinal and transverse grooves; and
c. the sum of the lengths, projected on a meridian section, of the transversely oriented grooves connected in pairs is between 0.75 and 1.5 times the width of the tread.

2. A pneumatic tire according to claim 1, characterized in that the ends of the transversely oriented grooves of the middle row not connected in pairs by the said grooves of reduced width are connected in pairs by incisions of practically zero width.

3. A pneumatic tire according to claim 1, characterized in that the width of the grooves connecting the transversely oriented grooves in pairs is greater in at least one side row of elements in relief than in the middle row of elements in relief.

4. A pneumatic tire according to claim 3, characterized in that the width of the grooves connecting the transversely oriented grooves in pairs is at most equal to half the width of said transversely oriented grooves.

5. A pneumatic tire according to claim 1, characterized in that the grooves connecting in pairs the transversely oriented grooves form zero angles with respect to the circumferential direction.

6. A pneumatic tire according to claim 1, characterized in that the grooves connecting in pairs the transversely oriented grooves form angles which have a small value with respect to the circumferential direction and which have opposite signs from one row of elements in relief to the next.

7. A pneumatic tire according to claim 1, characterized in that the transversely oriented grooves are linear and form an angle of 90° with the circumferential direction.

8. A pneumatic tire according to claim 7, characterized in that the circumferentially oriented grooves are zigzag.

9. A pneumatic tire according to claim 8, characterized in that the cuts connecting the transversely oriented grooves in pairs are parallel to the wide grooves of circumferential orientation.

* * * * *